United States Patent
Grimmett et al.

(10) Patent No.: US 10,240,970 B1
(45) Date of Patent: Mar. 26, 2019

(54) MOTION COMPENSATING INFRASOUND SENSOR

(71) Applicants: Douglas John Grimmett, San Diego, CA (US); Randall Plate, San Diego, CA (US); Chad Williams, New Albany, MS (US); Carrick Talmadge, Oxford, MS (US)

(72) Inventors: Douglas John Grimmett, San Diego, CA (US); Randall Plate, San Diego, CA (US); Chad Williams, New Albany, MS (US); Carrick Talmadge, Oxford, MS (US)

(73) Assignee: The United States, as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/707,269

(22) Filed: Sep. 18, 2017

(51) Int. Cl.
G01H 3/00 (2006.01)
G01H 9/00 (2006.01)

(52) U.S. Cl.
CPC .............. *G01H 3/00* (2013.01); *G01H 9/004* (2013.01)

(58) Field of Classification Search
CPC ................................ G01H 3/00; G01H 9/004
See application file for complete search history.

(56) References Cited

U.S. PATENT DOCUMENTS

2018/0166062 A1* 6/2018 Hoffberg ................ G10K 11/18

OTHER PUBLICATIONS

Grimmett, et al. "Ocean Heave Cancellation for a Maritime Infrasound Sensor," Oceans 2016 MTS/IEEE Monterey, Monterey, CA (Sep. 19-23, 2016), pp. 1-7 doi: 10.1109/OCEANS.2016.7761065.
Grimmett, et al, "Measurement of Infrasound from the Marine Environment", SPAWAR Systems, Center, Pacific Technical Report #2092, Sep. 2015.
Grimmett, et al., "Measuring Infrasound from the Maritime Environment", Springer Book Project: Infrasound and Middle-atmospheric monitoring: Challenges and Perspectives, Chapter 5.

* cited by examiner

*Primary Examiner* — Daniel Pihulic
(74) *Attorney, Agent, or Firm* — SSC Pacific Patent Office; Arthur K. Samora; Kyle Eppele

(57) ABSTRACT

Systems and methods for maritime infrasound detection can include at least one waterborne platform. A microbarometer, inertial measurement unit (IMU) and heave cancellation component (HCC) can be mounted on the waterborne platform. The HCC can receive a pressure input from the microbarometer and the IMU to generate an output pressure that can be indicative of an infrasound signal of interest (SOI). The HCC can further include a filter and an adaptive algorithm. The filter can receive IMU pressure and environment noise pressure as inputs. An error signal from the HCC output can also be supplied through a closed feedback loop that includes a Recursive Least Squares adaptive algorithm, which can further include a weighted, tapped delay line. The system can further include a remote data center for receiving the HCC output from the waterborne platform(s), which can be buoys, vessel or USV's.

14 Claims, 10 Drawing Sheets

MOTION COMPENSATING INFRASOUND SENSOR

FEDERALLY SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac22@navy.mil, referencing 104116.

FIELD OF THE INVENTION

The present invention pertains generally to sensors. More specifically, the present invention can pertain to infrasound sensors. The present invention can be particularly, but not exclusively, useful as infrasound sensors that can incorporate techniques that compensate for heave motion of the sensor, to allow for detection of infrasound by the sensor in a maritime environment.

BACKGROUND OF THE INVENTION

Infrasound is very low frequency airborne acoustic energy that is inaudible to human beings. Infrasound acoustic waves occupy the frequency band of about 20 Hz to 3.3 mHz. Natural sources of infrasound can include earthquakes, meteors, volcanoes, tsunamis, auroras, and ocean swells. Anthropogenic sources of infrasound can include atmospheric and underground nuclear explosions. Because of its low frequency, infrasound waves experience little attenuation, and can therefore propagate to, and be detectable from, very long distances. Although the signals are inaudible, they may be detected using advanced infrasound sensing technology at ranges of 100s to 1000s of kilometers. The Comprehensive Nuclear Test Ban Treaty Organization (CTBTO) operates a worldwide network of about 60 land-based infrasound monitoring stations whose primary purpose is to detect nuclear test explosions. Land-based infrasound sensors can also routinely detect infrasound that is caused by other sources of infrasound at great distances.

From the above, it can be seen that wide global infrasound coverage can be obtained on land using the CTBTO land-based network. However, two thirds of the earth's surface is composed of oceans, and no capability yet exists to monitor infrasound from sensors fielded in the maritime environment (via boat, buoy or Unmanned Surface Vehicle (USV)). The challenges of developing such a capability may be significant; however, overcoming these challenges can provide maritime infrasound coverage where it does not exist, or where it is unreliable due to variable environmental conditions. In addition, event detection redundancy can be achieved by multiple monitoring stations along different propagation paths, which is a desirable capability that could improve event detection confidence, classification information, and localization/tracking performance. Such an expansion of infrasound monitoring capabilities may also provide more complete environmental characterization, which can be important for understanding infrasound performance worldwide. Several technical challenges to operating infrasound sensors in the maritime exist: overcoming heave-induced interference, mitigating noise from wind, forming multi-sensor arrays, and survivability in the harsh, salt water environment. In particular, a solution is needed to overcome to the degrading effects of vertical heave on sensors that are fielded on maritime platforms (boats, buoys, or unmanned surface vehicles, USVs), or that are subject to an undulating ocean surface.

Infrasound monitoring sensors are normally situated on land and consist of micro barometers capable of measuring very small changes in local air pressure. As mentioned above, deployment of an infrasound sensor in the maritime or airborne environment may expose the sensor to motion effects, since the platform is moving with ocean swell and waves in the case of maritime deployment, and with vehicle/platform motion in the case of airborne deployment. The sensor may experience motion along 6 degrees of freedom: surge, sway, yaw, pitch, roll, and heave, However, heave can be the most significant degree of freedom, as even small changes in vertical displacement (heave motion) will induce a change in ambient atmospheric pressure, causing an interference signal against which infrasound signals may be difficult to detect.

In view of the above, it can be an object of the present invention to provide a maritime system which can detect infrasound signals. Another object of the present invention can be to provide a maritime infrasound detection system that can overcome heave-induced interference. Still another object of the present invention can be to provide a maritime infrasound detection system that can account for environmental noise due to rain and wind conditions. Yet another object of the present invention can be to provide a maritime infrasound detection system that can be persistent and autonomous. Another object of the present invention can be to provide a maritime infrasound detection system that can be easily implemented in a cost-effective manner.

SUMMARY OF THE INVENTION

Systems and methods for maritime infrasound detection according to several embodiments of the present invention can include at least one waterborne platform. A microbarometer, an inertial measurement unit (IMU) and a heave cancellation component (HCC) can mount on the waterborne platform. The microbarometer can have sufficient sensitivity to detect a pressure gradient of at least 12.5 Pascals per meter (12.5 Pa/m). The HCC can receive a pressure input from the microbarometer and the IMU and can generate an output pressure that can be indicative of an infrasound signal of interest (SOI).

The HCC can further include a filter and an adaptive algorithm. The filter can receive IMU pressure and environment noise pressure as inputs. An error signal from the HCC output can also be supplied through a closed feedback loop that includes an adaptive algorithm. The adaptive algorithm can be a Recursive Least Square (RLS) algorithm (other algorithms such as Least Means Squares, or LMS can also be used) that can include a weighted, tapped delay line of 11 taps. The number of taps can be thought of as a tuning parameter for the system, and it can be adjusted up or down as needed for performance of the system. The system can further include a remote data center for receiving the HCC output from the waterborne platform(s). The waterborne platform can be selected from buoys, vessels and unmanned surface vehicles (USV's).

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

In brief overview, infrasound waves are longitudinal acoustic pressure waves. Infrasound pressure fluctuations for sources of interest can be small when compared to the ambient pressure. The ambient pressure at sea level can be referred to as the atmospheric pressure (or hydrostatic pressure), which is due to the accumulated weight of the air in all of the atmospheric layers above. Nominal value for atmospheric pressure can be 101,325 Pascals, Pa, (or 1 atmosphere, atm). The received pressure wave signals for various infrasound sources can be from a range of about 5,000 to 1,000,000 times smaller than the ambient pressure.

Ambient pressure decreases with altitude according to $$P = P_0 (1 - LhT_0) MRL \qquad (1)$$

where $P_0$ is sea-level atmospheric pressure (in Pa), h is the altitude, L is the temperature lapse rate for dry air, $T_0$ is sea level temperature, g is gravitation acceleration, M is the mass of dry air, and R is the universal gas constant. At sea level, where the infrasound sensor is to be located in some embodiments, changes in pressure due to slight changes in ocean heave can approximated by $$\Delta P = -\rho g \Delta h \qquad (2)$$

where $\rho$ is the air density. For a standard atmosphere (1 atm and 0° C.), $\rho = 1.2754$ kg/m3, and $$\Delta P / \Delta h \approx -12.5 \text{ Pa/m}. \qquad (3)$$

Therefore, at sea level the pressure gradient with altitude can be approximately −12.5 Pa/m. The implication can be that an infrasound sensor, deployed in the maritime environment and moving vertically up and down (i.e., heaving) with ocean swell, will also be subject to the pressure fluctuations due to changes in ambient atmospheric pressure of −12.5 Pa/m. This heave-induced signal may be of significant strength, and potentially obscure and interfere with the detection of actual infrasound signals of interest.

Figure 1:
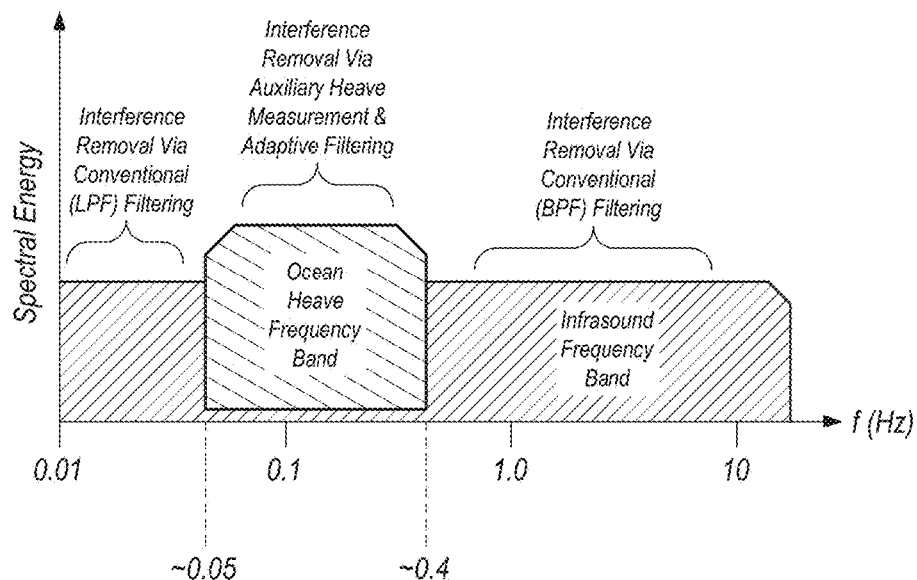
FIG. 1 is a depiction of the region of overlap between the infrasound frequency band and the ocean heave frequency band as known in the prior art.

Referring initially to FIG. 1, sea surface roughness models and measurements as known in the prior art can indicate that the ocean heave frequency band is generally between 0.05-0.4 Hz, corresponding to wave periods of about 2-20 seconds. This wave energy band is directly within the infrasound band, and therefore, the potential exists that ocean heave can produce interference in the portion of the infrasound frequency band that is of interest to the systems and methods of the present invention according to several embodiments. Sea surface roughness is primarily driven by sustained winds, whether in the local area or from far away, which can cause ocean swell that can propagate to great distances.

If the heave-induced signal and the infrasound signal of interest (SOI) occupy different and disjoint frequency bands, conventional filtering methods will be successful in separating the SOI from the heave "noise" without any ill effect. However, where the heave frequency spectrum and the infrasound SOI spectrum overlap, as shown in FIG. 1, then an adaptive heave compensation method will be required.

Figure 2:
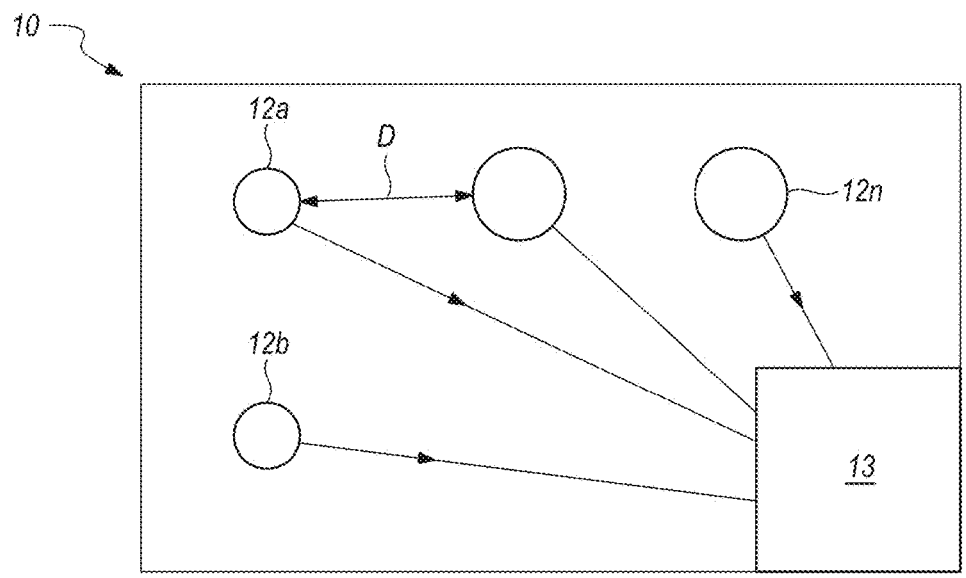
FIG. 2 is a block diagram of the maritime infrasound system of the present invention according to several embodiments.

With the above in mind, and referring now to FIG. 2, the maritime infrasound sensing system of the present invention can be shown and can be generally designated by reference character 10. As shown, system 10 can include a plurality of waterborne sensing platforms 12. The platforms can be spaced apart from each by a uniform distance "D", or they can be spaced by different distances D according to the geometry of the body of water to be monitored, the number of platforms 12 needed, available of a data link and location of a data link receiver, and other factors as selected by the operator. Typically, D can be around several hundreds of meters or more. Platforms 12 can be a buoy (platform 12a), a vessel (platform 12n) or an unmanned surface vehicle (USV), as denoted by platform 12b in FIG. 2. It should also be appreciated that if further development in the heave cancellation component algorithm discussed more fully below are realized, then aircraft and/or unmanned aerial vehicles (UAV's) can also be incorporated into the system 10 for detection of infrasound signals. The platform outputs (in any) can be transmitted to data center 13 via RF communications, internet protocol, satellite uplink or other methods for data transmission as known in the prior art.

Figure 3A:
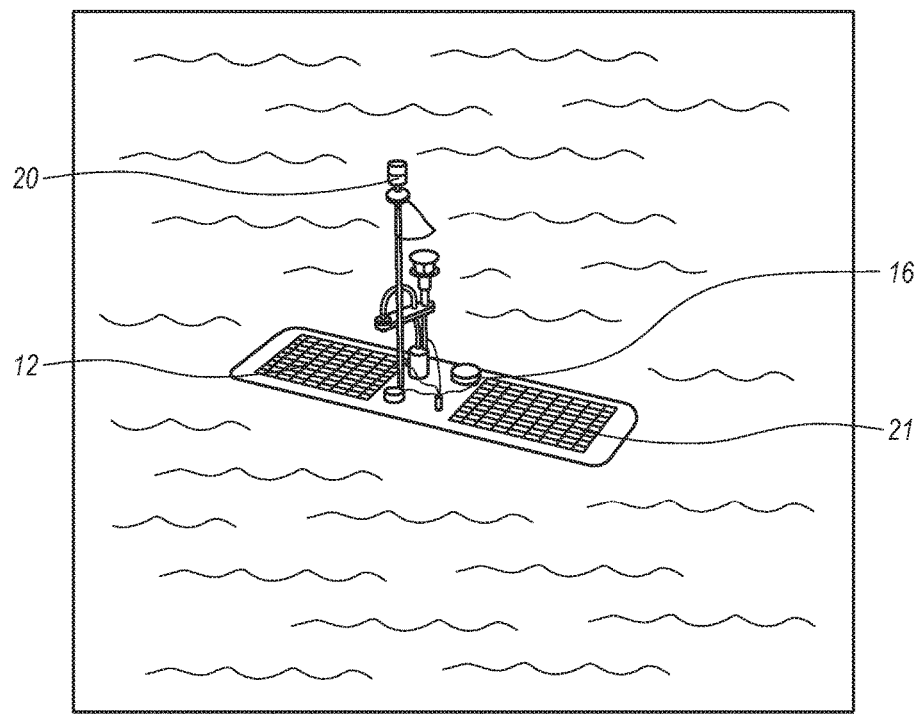
FIG. 3A is a side elevational view of an unmanned surface vehicle (USV) embodiment of the waterborne platform for the system of FIG. 2.
Figure 3B:
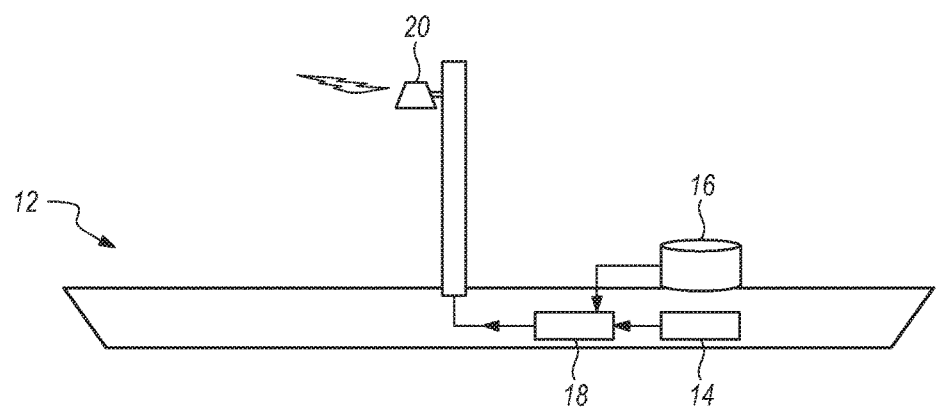
FIG. 3B is a cross-sectional diagram of the USV of FIG. 3A.

Referring now to FIGS. 3A and 3B, a platform 12 that can be a USV can be shown in greater detail. One example USV that could be used is the WaveGlider™ brand USV, but other USV's could also be used.

As part of the solution to the heave interference problem cited above, an independent measurement of the infrasound sensors heave is needed. To do this, and referring again to FIGS. 3A and 3B, the waterborne platform 12 of the present invention can include an Inertial Measurement Unit (IMU) 14, which can track motion of a microbarometer 16 with 3-axis accelerometers and 3-axis gyros, and which can independently compute accurate measurements of heave. For the systems and methods, IMU 14 can have sufficient sensitivity to detect heave of as little as six centimeters (6 cm). Microbarometer 16 can measure infrasound, as microbarometers can provide very accurate measurements at extremely low frequencies. Thus, platform 12 can further include a micro-barometer 16 co-located with IMU 14 (IMU can also be nearly co-located with microbarometer 16, provided the offset distance is known). The microbarometer 16 can be sensitive enough to detect weak infrasound signals that have travelled long distances; however they can also be subject to pressure fluctuations when the sensor experiences even slight changes in altitude, even though slight changes due to heave of the platform 12.

IMU 14 and microbarometer 16 can provide pressure readings and motion readings, respectively, into heave cancelling component (HCC) 18, FIG. 3B. HCC 18 can provide a communications link output of data to transceiver 20 for further transmission to data center 13, as described above. Power source 21 can provide the power necessary for the IMU 14, microbarometer 16 and HCC 18 and transceiver 20 to operate. The measurements by microbarometer 12 and IMU 14 can then be used as a reference signal in an adaptive noise cancellation algorithm used by HCC 18, as discussed in more detail below.

Figure 4:
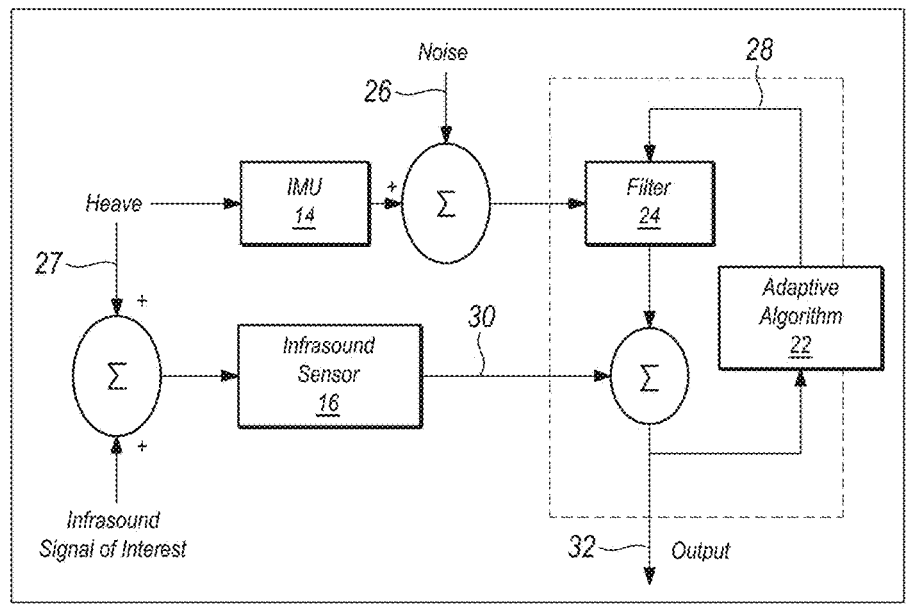
FIG. 4 is block diagram depicting the heave cancellation component (HCC) and the adaptive heave cancellation algorithm of the present invention according to several embodiments.

Referring now to FIG. 4, FIG. 4 can show a block diagram of the platform components and their relationships implemented by HCC 18. The microbarometer 16 can sense the pressure signals originating from both the infrasound SOI and the ocean heave. A noisy estimate 26 (due to self-noise of system 10) of the heave (arrow 27) can be obtained via the external IMU 14. The filter 24 can include a tapped delay line of N samples (taps) of the IMU signal with adjustable weights. Filter 24 can also include a past data exponential weighting (or forgetting factor) parameter. The sum of the weighted IMU samples and self-noise can be subtracted from the infrasound sensor sample (reference character 30) to produce the system output, arrow 32. The output can also be supplied as an error signal to an adaptive algorithm (represented by box 22 in FIG. 3) through a feedback loop 28, which can adjusts the weights of the adaptive filter 24 to minimize the error for the next iteration of the filter's operation.

The adaptive algorithm used here can be the Recursive Least Squares (RLS) algorithm. Other adaptive algorithms could certainly be used, such as Least Mean Squares or other adaptive algorithms. As the filter 24 of HCC 18 adapts using this feedback loop, it can drive the output 32 to be as small as possible, which corresponds to maximum removal of the correlated heave signal, so that the output more closely represents just the infrasound SOI and/or the natural infrasonic noise background, with the pressure changes to due to heave and IMU self-noise having been removed.

To test the above, a microbarometer manufactured by Hyperion Technologies, and developed by the National Center for Physical Acoustics (NCPA) and an IMU unit made by SBG Systems were installed in close proximity to each other on the upper deck of the R.V. Acoustic Explorer ship (stated differently, for the embodiment of the present invention that was tested, the waterborne platform 12 is a vessel). The installation of IMU 14 and microbarometer 16 was located as immediately above the intersection of the ship's transverse axis center of rotation (COR) and the shipboard fore-and-aft COR, to minimize any negative effects of pitch and roll on the heave measurements. Any residual distance offset between the IMU and COR was measured and programmed into the IMU firmware to be accounted for in its heave calculation algorithm. The ship was deployed off the coast of Southern California and data was recorded for about a one week period. Sea conditions during the period were low with swell causing heave fluctuations of usually less than 0.5 meters.

A five-minute segment of microbarometer pressure and IMU heave data was selected for analysis, and a data segment representative of the entire deployment was selected for analysis. The original microbarometer 16 pressure and IMU 14 heave time series data were low pass filtered below 0.5 Hz in order to isolate the effect of heave from other acoustic energy which may have been present in the collected measurement (signals outside of the heave band can be recovered via normal band pass filter methods). The pressure and heave time series were resampled to have a common sample rate of 25 Hz, which is oversampled by a factor of about 10. The heave data were converted from distance units (meters) to pressure units (Pa) using the relationship in Eq. 3 above.

Figure 5:
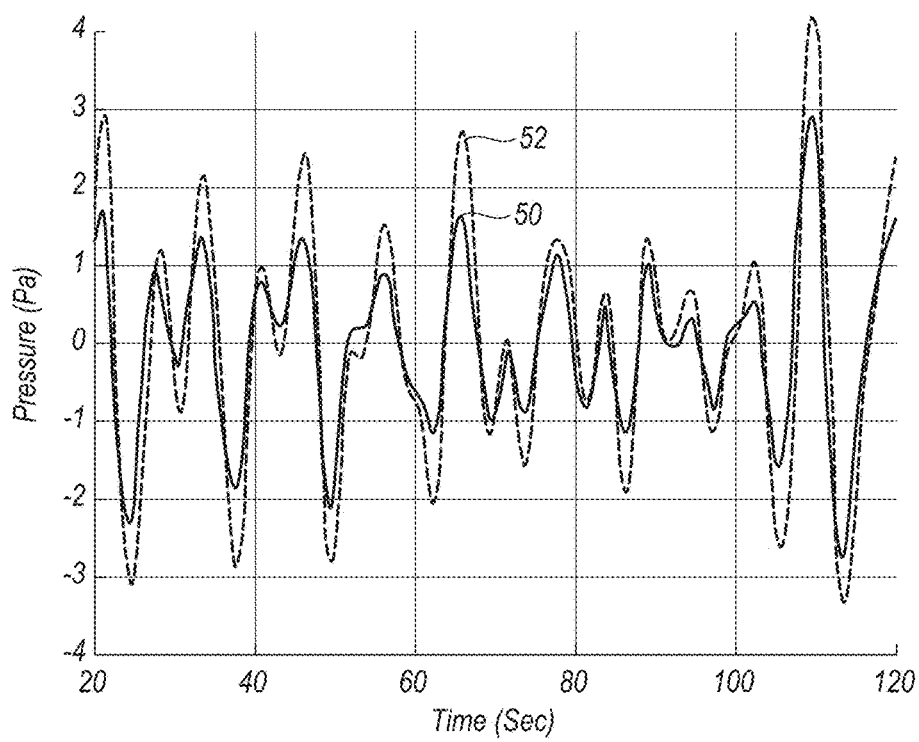
FIG. 5 is a graph of pressure versus time for the microbarometer pressure signal time series and IMU heave signal time series selected for analysis for the system of FIG. 3.
Figure 6:
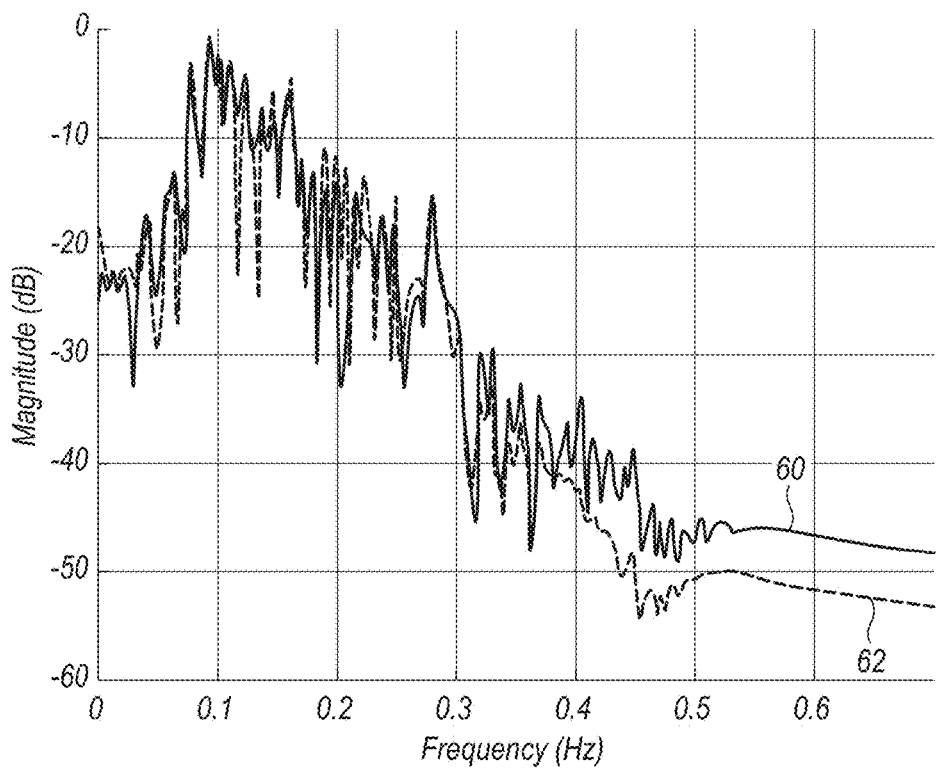
FIG. 6 is a graph of magnitude (in dB) versus frequency for microbarometer pressure signal spectra and IMU heave signal spectra corresponding to the signals in FIG. 6.

Referring now to FIGS. 5-6, FIG. 5 shows a comparison between a 120 second segment of the pressure (curve 50) and heave (curve 52) signal time series. One criteria of the performance of the adaptive cancellation filter can be the degree to which the two signals are correlated. FIG. 5 shows that the two signals are closely correlated. More specifically, the normalized correlation function was computed between these signals and the peak correlation coefficient was found to be 0.97. The high degree of correlation is visually evident in the time series of FIG. 5. The microbarometer spectra 60 and heave spectra 62, computed over the entire 300-second time window, are shown overlaid in FIG. 6, and are also seen to be very similar. From FIGS. 5-6, it can be clear for this data segment that the heave is sufficiently strong to be a dominant effect, potentially obscuring other quieter infrasound signals that may be present.

In order to assess and quantify the performance of the heave cancellation algorithm of the present invention according to several embodiments, an artificial signal can be chosen that is representative of an infrasound signal-of-interest (SOI). Doing this can also facilitate quantitative assessment of the algorithm's performance under different SOI sound pressure levels. For the artificial signal SOI, one was chosen that can occupy a similar frequency band as the actual heave which was present during the experiment. For the analysis, a separate, uncorrelated ocean heave measurement for the SOI was obtained from a sea surface roughness ocean monitoring buoy, which is a part of the Scripps Institution of Oceanography's Coastal Data Information Program (CDIP).

Figure 7:
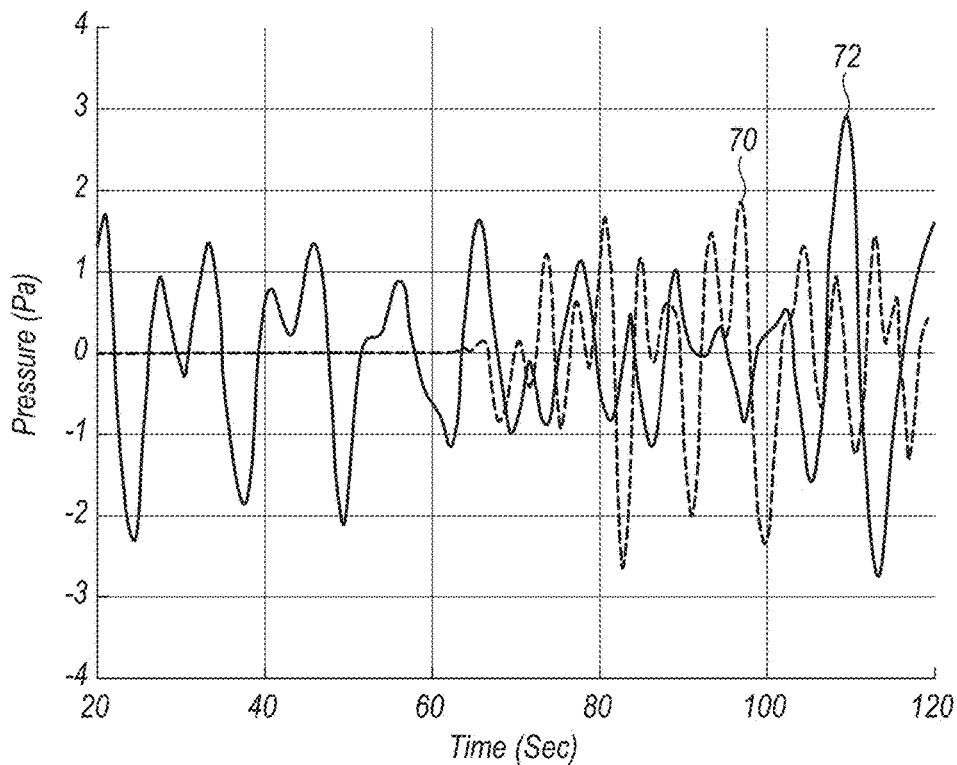
FIG. 7 is a graph of pressure versus time for an artificial infrasound signal of interest (SOI), compared to the microbarometer pressure signal time series.
Figure 8:
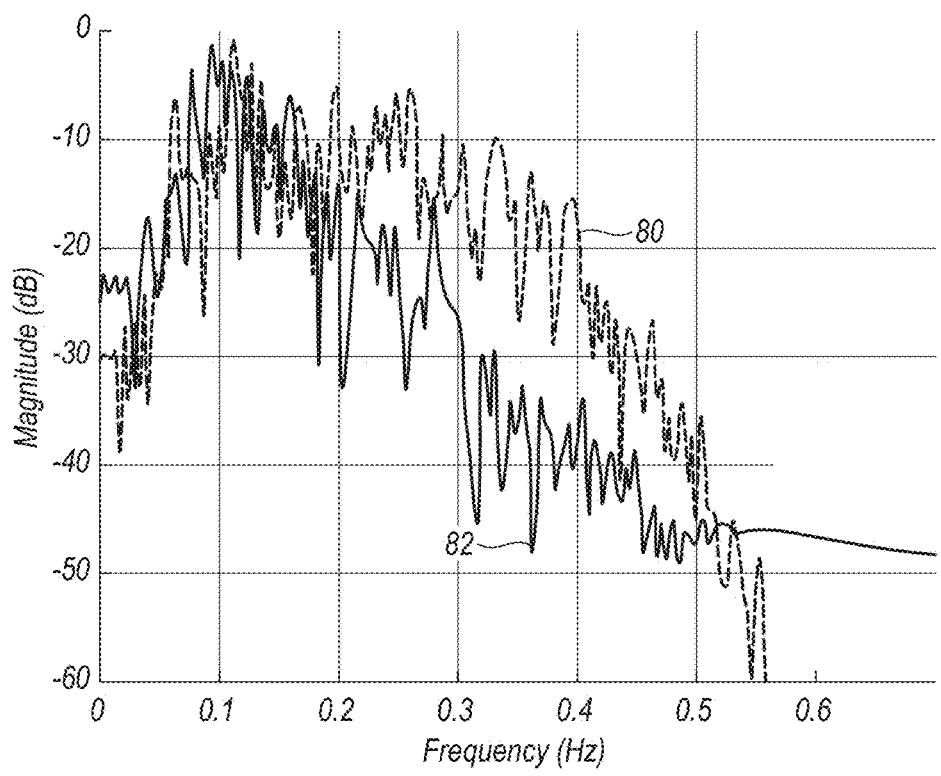
FIG. 8 is a graph of magnitude versus frequency for a comparison of the spectra of the artificial infrasound SOI and the microbarometer pressure signal of FIG. 7.

Referring now to FIGS. 7-8, FIG. 7 can show a portion of the artificial SOI (obtained from a CDIP buoy) when compared to the microbarometer received signal. The artificial SOI is appropriately scaled to produce equal acoustic power as the sensor pressure signal and is injected after 60 seconds. Note that the signal in FIG. 7 was injected only after 60 sec, with no signal injected during the first minute of the data used in this analysis. This can enable a greater understanding of the performance of the algorithm as opposed to when there is no SOI present. Also, the SOI (curve 70) has been amplitude scaled so that it can have equivalent power as the heave-dominated microbarometer pressure signal (curve 72), i.e., a SOI-to-Heave-Ratio (SHR) of 0 dB. The normalized correlation coefficient between the non-zero portion of the injected SOI and the sensor pressure signal was 0.27, and is clearly observed to be uncorrelated. FIG. 8 shows a comparison of the two signals' spectra (curves 80 and 82), which shows that although they occupy the same frequency band, they do not share a similar, detailed spectral structure, i.e., they are different signal that can be resolved by the systems and methods of the present invention according to several embodiments.

Figure 9:
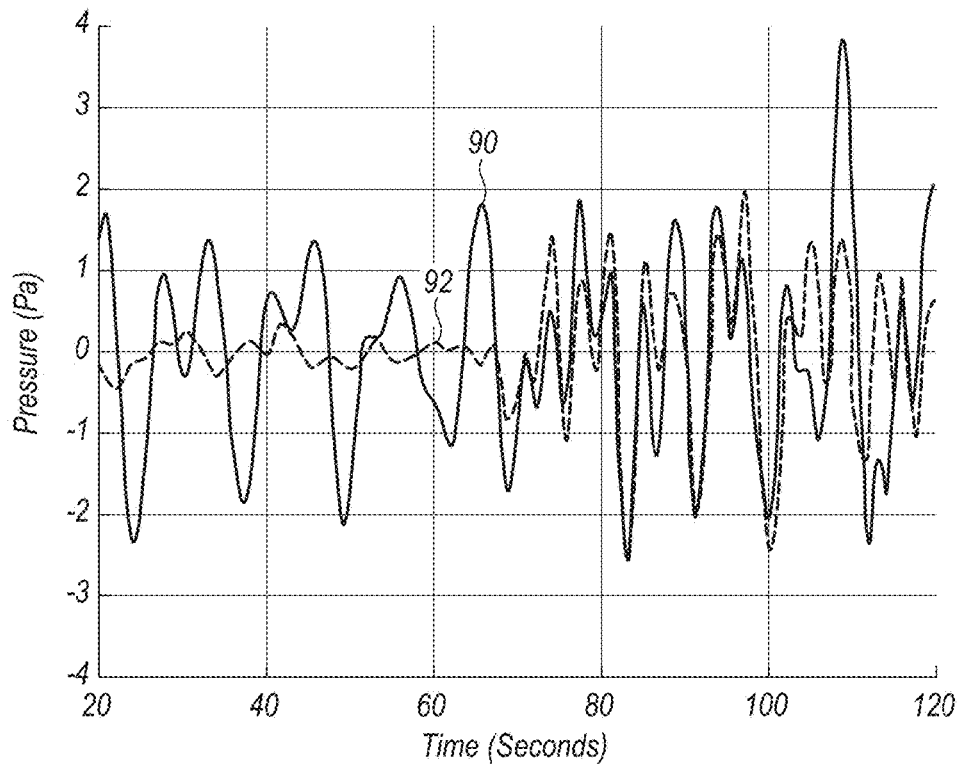
FIG. 9 is a graph of pressure versus time, which can compare a composite signal input to an output signal of the adaptive cancellation filter before and after injection of the SOI.

Referring now to FIG. 9, the artificial SOI can be injected into the data set by summing with the received microbarometer pressure signal. The resulting signals before and after injection can be shown in FIG. 9 as curve 90. This composite signal 90 ca be composed of the as-yet unobservable infrasound background noise, the heave-induced pressure signal, and the injected artificial SOI with an SHR 0 dB (shown over the interval from 60-120 sec). Before 60 sec it can be seen that the composite curve 90 can be just the microbarometer signal which is dominated by the heave effect. This composite signal can serve as the input signal to the adaptive noise cancellation system. The IMU heave measurement can be fed to the HCC 18 of system 10 as the reference signal (curve 52 from FIG. 5). The RLS algorithm of adaptive algorithm (block 22 in FIG. 4) of adaptive filter was run with a length of 11 taps and a past data exponential weighting (or forgetting factor) parameter set to 0.9999; its output 32 (FIG. 4) is shown as curve 92 in FIG. 9. The result can show effective cancellation of the heave-induced pressure component, while the injected SOI 90 has been recovered. The residual output signal in curve 92 in FIG. 9 seen before sixty seconds is likely the actual infrasound noise background without the interference of ocean heave.

Figure 10:
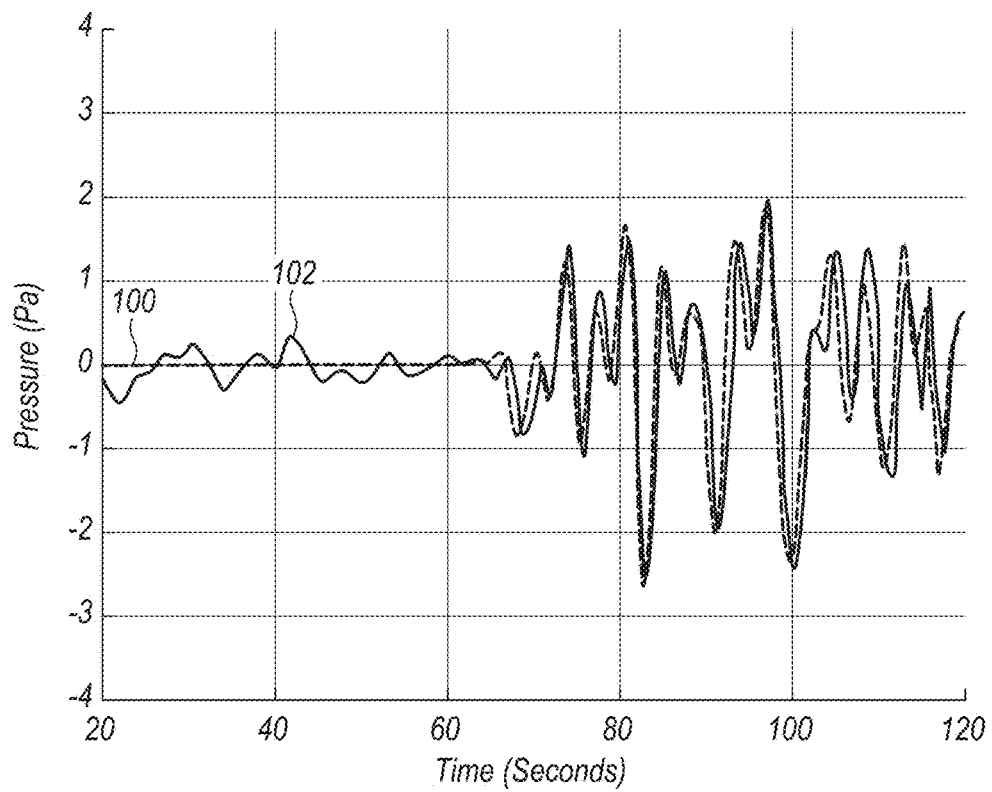
FIG. 10 is a graph of pressure versus time, which can compare the injected infrasound SOI and the adaptive cancellation filter's output, for the data of FIG. 9.

FIG. 10 compares the injected SOI 100 and the adaptive filter's output 102. In FIG. 10, it can be seen that the cancellation algorithm has effectively recovered the SOI (shown over the interval from 60-120 sec) and revealed its estimate of the true (heave-less) infrasonic noise background (before 60 sec).

Figure 11:
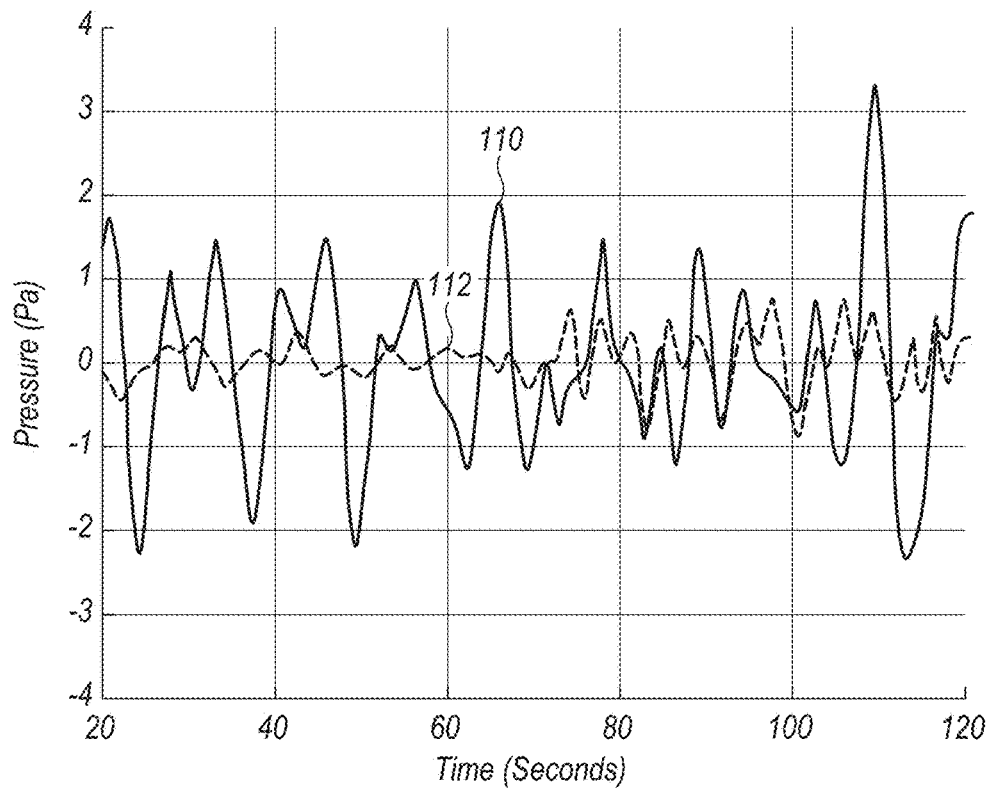
FIG. 11 is the same graph as FIG. 10, but with a composite input signal of much smaller power input to the adaptive cancellation filter (roughly one eighth the power of the input signal of FIG. 9)
Figure 12:
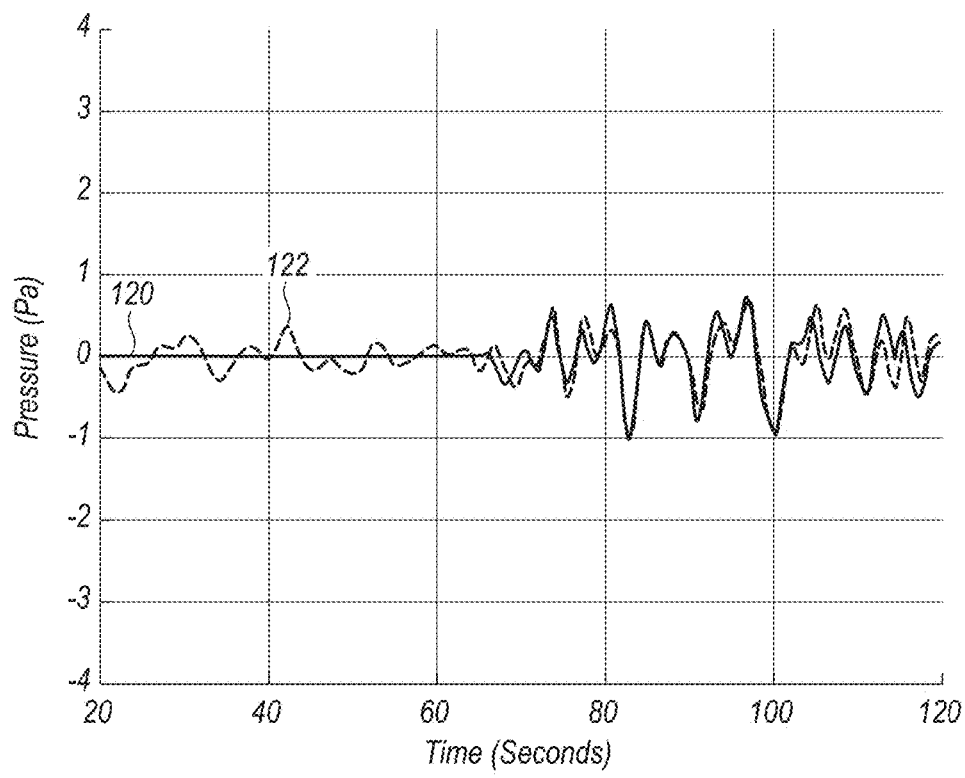
FIG. 12 is a graph of pressure versus time, which can be used to compare the injected infrasound SOI and the adaptive cancellation filter's output, for the data resulting from the smaller signal shown in FIG. 11.

Referring now to FIGS. 11-12, like FIG. 9, FIG. 11 is a graph of an artificial SOI can be injected into the data set by summing with the received microbarometer pressure signal. FIG. 11 shows the filter input (curve 110) and output (curve 112) when the SOI has been reduced in power by 9 dB relative to the previous example. Here the filter's input 110 looks very nearly identical to the heave-dominated sensor pressure signal (represented by curve 110, see also curve 70 in FIG. 7), since the SOI is small. The output 112 shows that a SOI has been recovered and that it is still detectable above the infrasound noise floor, even though it has been greatly reduced in power from the prior data set, which can indicate the systems and methods of the present invention according to several embodiments can detect very small SOI's. FIG. 12 shows the similarity of the injected SOI 120 and the filtered output's SOI 122 after sixty seconds.

Figure 13:
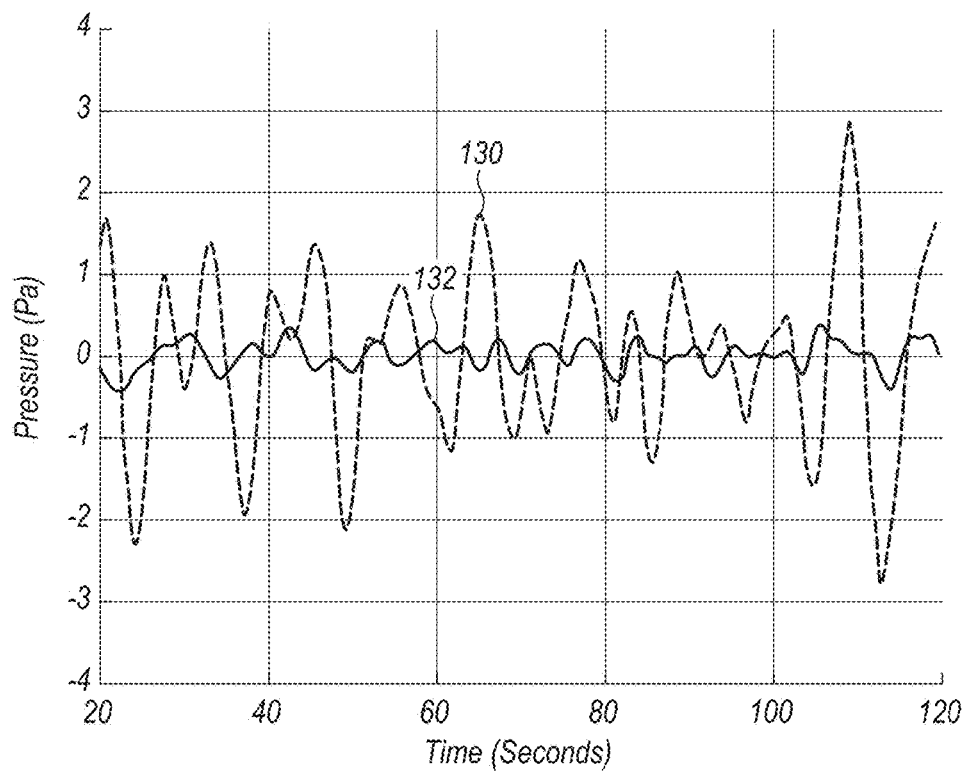
FIG. 13 is a graph of pressure versus time, which can be used to compare the composite signal without any injected artificial infrasound SOI input to the adaptive cancellation filter and the filter's output.
Figure 14:
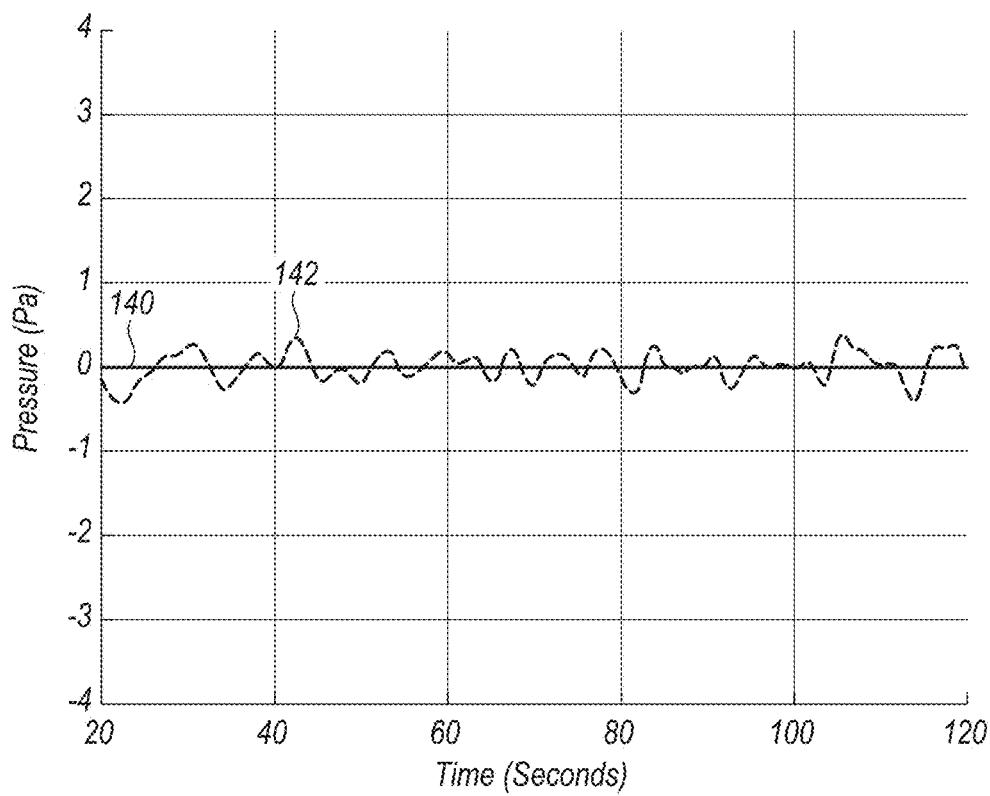
FIG. 14 is a graph of pressure versus time, which can be used to compare the injected infrasound SOI and the adaptive cancellation filter's output, for the data in FIG. 13.

Referring now to FIGS. 13-14, FIG. 13 can show the heave-dominated pressure signal input 130 without an injected SOI, and the filter's output, a heave-less infrasound noise background, in this case, zero signal, curve 132. FIG. 14 can be a comparison of the injected infrasound SOI (curve 140) with the adaptive cancellation filter output (curve 142) for the input composite signal 130 of FIG. 13. The flat line 140 in FIG. 14 can be taken to mean that there is no heave portion of the signal (heave can be canceled by the systems and methods of the present invention). By cross-referencing FIGS. 13 and 14, it can be seen that line 132 matches lines 142, which can imply that the infrasound background is being recovered. Also, the algorithm's heave power reduction can be found to be about 14 dB, for the conditions of this experiment, with the given infrasound noise floor level, and the heave fluctuations that were limited to less than 0.5 meter.

Figure 15:
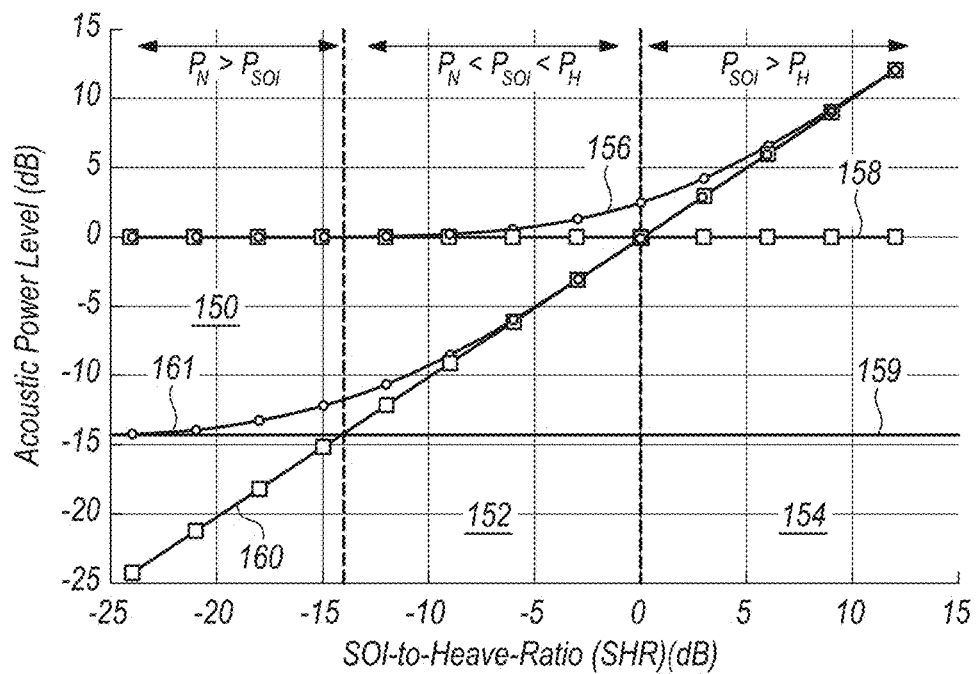
FIG. 15 is a graph of acoustic power versus signal-to-noise ratio (SNR) in dB for the signal-of-interest (SOI) at mean acoustic power levels as a function of the SOI to heave ratio (SHR)
Figure 16:
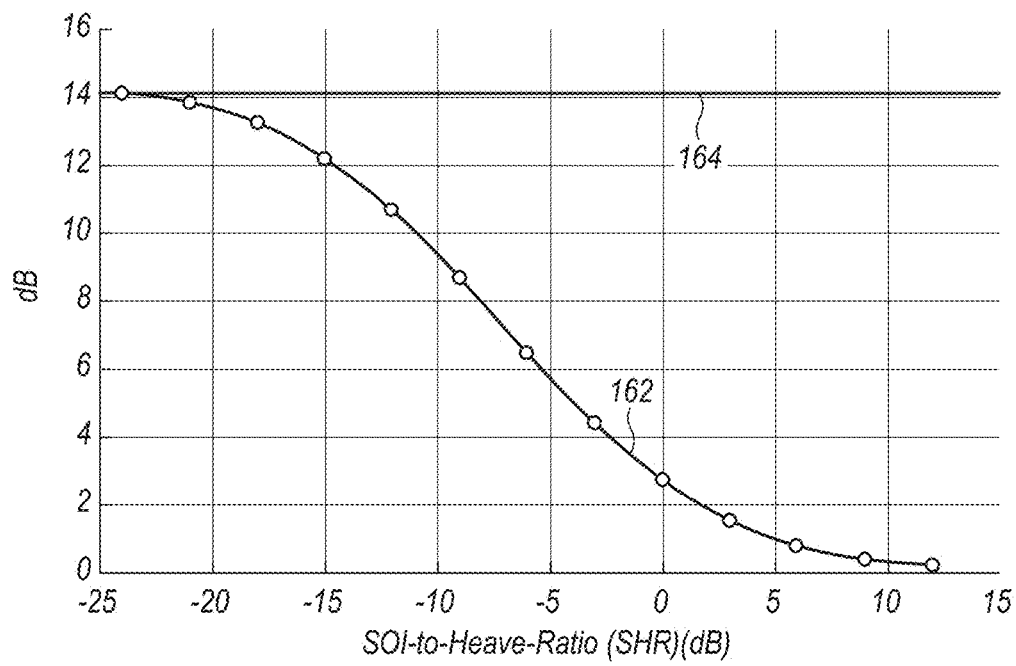
FIG. 16 is a graph of dB versus SHR, which can illustrate the suppression achieved by the system of FIG. 2, and with detectability improvement demonstrated as a function of SHR.
Figure 17:
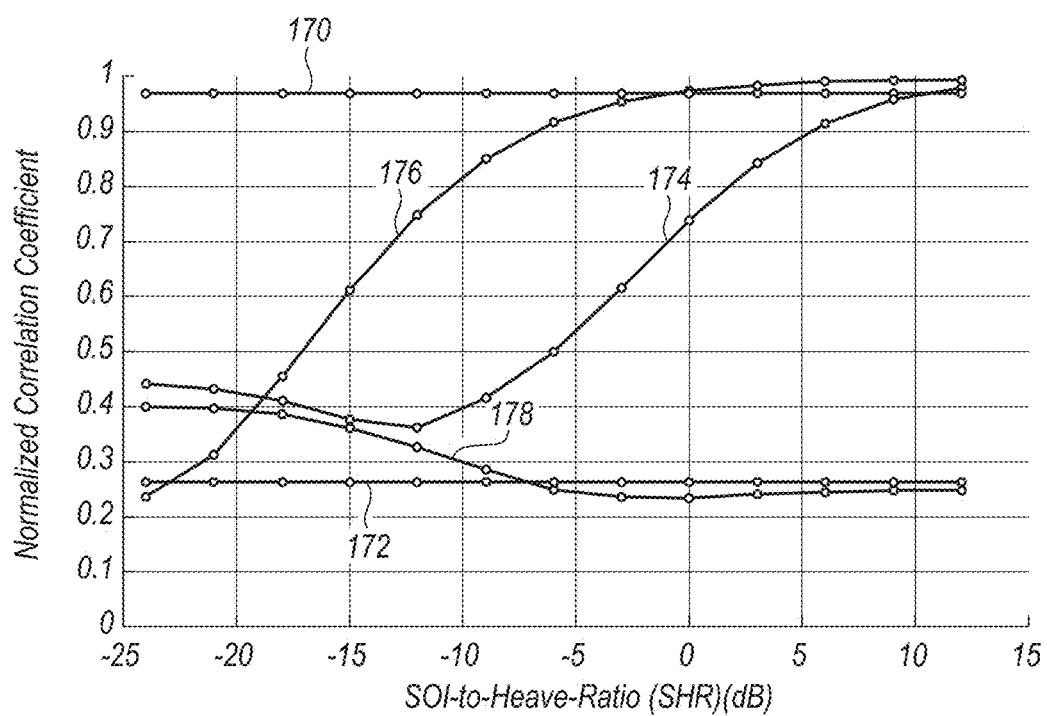
FIG. 17 is a graph of normalized correlation factor coefficients versus SHR, which can illustrate various correlation properties of the various signals as a function of SHR; and, FIG. 18 is a block diagram, which illustrates steps that can be taken to accomplish the methods of the present invention according to several embodiments

In order to fully characterize the performance of the heave cancellation algorithm, and as shown in FIGS. 15-17, the injected SOI can be scaled over a range of SHR's to characterize the effectiveness of SOI recovery and heave cancellation for the systems and methods of the present invention. The input signal SHR can be varied by doubling the SOI mean power (in 3 dB increments) from −24 dB to +12 dB relative to the heave-dominated pressure signal (SHR=0 dB can imply that the equal power case presented in FIGS. 7-10). The variation is curve 160 in FIG. 15. For each of these cases, the cancellation performance can be evaluated.

Referring now to FIG. 15, FIG. 15 can illustrate the results of the evaluation. FIG. 15 can show the acoustic power levels of the various signals in the processing, in dB relative to the power of the heave. Three regimes are indicated: power of the SOI less than the power of the infrasound noise background ($P_N > P_{SOI}$), region 150 in FIG. 15, power of the SOI greater than the power of the heave interference ($P_{SOI} > P_H$) region 154 and power of the SOI greater than noise power but less than the heave interference ($P_N < P_{SOI} < P_H$), region 152 in FIG. 15. The heave interference power (line 158) can be shown to be constant at 0 dB and the infrasound noise background was determined to be −14 dB, line 159. This can be estimated by measuring the amount of suppression achieved by the filter when no SOI was injected.

The filter input signal 156 in FIG. 15 can be the composite (power sum) of the acoustic noise background, the heave-induced interference, and the SOI. It can be seen that the filter input power can be dominated by the heave (curve 158), until the SOI power becomes equal to the heave. As the SOI power increases further in the regime $P_{SOI} > P_H$, the filter input signal becomes dominated by the SOI (curve 160). Here, the SOI 160 may already be strong enough to be detectable above the heave interference; however, the heave reduction algorithm will further increase its detectability. When dominated by the SOI, the filter's output signal 161 can have the heave removed while retaining the SOI, so its power is close to the power of the SOI. As the input SOI power drops in the region 152 ($P_N < P_{SOI} < P_H$), it can be seen that the filter can be able to reduce the heave up to the point that the SOI becomes dominant, and its power is commensurately reduced from the input. In this regime, the SOI is not detectable at the input, but after applying the systems and methods of the present invention according to several embodiments, it can become detectable. When the input SOI power drops below the infrasound noise floor ($P_N > P_{SOI}$), or where curve 160 is below curve 161, the SOI can be obscured by the infrasound noise floor and therefore will not be recoverable using this method, even when the heave has been reduced by its maximum amount. Other noise cancellation processes (e.g., beamforming etc.) may be considered to improve detectability in this case.

Referring now to FIG. 16, FIG. 16 can also show the amount of acoustic power suppression that can be achieved using the systems and methods of the present invention according to several embodiments. As shown in FIG. 16, the SOI can be buried further underneath the heave, increases in suppression are observable. This is shown to increase to a maximum amount of 14 dB as SHR drops (curve 162). As SHR increases, the amount of heave cancellation that is possible, and by which the SOI is recovered, drops until no reduction in the output power is achieved. However, it is important to understand that while the amount of output power varies due to the strength of the input SOI power, the SOI detectability is always improved (curve 164 in FIG. 16), by the same amount, which in this case is 14 dB. The amount of detectability improvement possible with this algorithm can depend on the difference between the power levels of the data's heave interference due to ocean swell and the infrasound noise background, as well as how correlated the filter reference signal is and how well the algorithm is tuned.

Another way to characterize the performance of the systems and methods of the present invention can be to look at the correlation properties of the various signals in the process. To do this and referring now to FIG. 17, FIG. 17 shows the peak normalized cross correlation coefficients versus the SHR for various pairs of signals. The microbarometer pressure signal can be composed of the heave interference and acoustic noise background, without the injected SOI. When this signal is correlated with the IMU heave signal (filter reference signal), a constant, high correlation value of 0.98 (170 in FIG. 17) can be obtained. The amount of correlation between the input and reference signals in an adaptive noise cancellation algorithm can be an excellent criterion and can be an excellent predictor of performance. The IMU signal available here can be highly correlated and therefore can provide an excellent reference signal for the adaptive noise cancellation algorithm. The microbarometer pressure signal correlation with the SOI can also be constant, but with a low value of about 0.26, as indicated by line 172 in FIG. 17. Though the two signals have similar frequency content (as they are both dominated by ocean heave), they are different signals and so this results in a low correlation value.

The filter input can be highly correlated with the filter output (line 174) in FIG. 17 when the SHR is high due to the input signal being dominated by the injected SOI, and the SOI can be preserved in the filter's output. As SHR is lowered, the input can become more dominated by heave, and the filter's output effectively cancels the heave, so the correlation drops. Similarly, for the filter 24 output and the SOI, when the SOI is large the filter's output can preserve the SOI and the correlation can be high, as depicted by line 176 in FIG. 17. When the SOI drops, the infrasound noise floor becomes more dominant and the filter is less capable of recovering the SOI in the output, resulting in lower correlation values. Assuming the adaptive filter is doing its job of removing heave effects, the filter output should not be correlated to the heave (reference) IMU input and out signals, which is seen to be the case in FIG. 17, as can be seen by curve 178.

The results above can be taken to show that the systems and methods of the present invention can effectively cancel the ocean heave-induced pressure fluctuations and recover an infrasound SOI. In this particular data set, the heave fluctuations were not extraordinarily large (~0.5 meter heave, corresponding to ~6 Pa pressure fluctuations). Nevertheless, the method was shown to be effective in suppressing the heave down to the level of the real acoustic noise floor. For this data, suppression of at least −14 dB was achieved. The injection of an artificial SOI can further enable an analysis of the algorithm performance as a function of the strength of that signal, relative to the heave interference level. At high injected signal levels, the algorithm incorporated into filter 24 with non-transitory written instructions, can preserve the signal and can reduce the heave interference; when the injected signal is below the interference, it can recover the signal which would have previously been undetectable in a maritime environment.

When the signal of interest is below the natural infrasonic noise background, this method may not be sufficient to recover the signal. It is expected that had the sensor been subject to higher ocean heave conditions, and therefore limited by higher interfering pressure fluctuations, the amount of heave suppression made possible by this algorithm would have been even greater than the amount (14 dB) demonstrated here. Future work will continue to evaluate the performance of the algorithm with the sensor fielded on a USV platform (vice a boat) and in wider variety of ocean conditions. In fact, adjustment of the number N of taps of weighting of taps in the RLS, of the use of adaptive cancellation algorithms other than RLS, or the selection of different IMU 14 of microbarometers, using Equations (1), (2) and (3) as design criteria, may allow for cancellation of more severe heaving motion such as that found in aircraft and/or UAV's, which could allow for on-station UAV's to be incorporated into system 10 as platforms 12. Other, separate challenges to address are self-noise and/or wind noise mitigation and cancellation, and forming multi-sensor arrays for sensors fielded in the maritime environment are also certainly possible.

Figure 18:
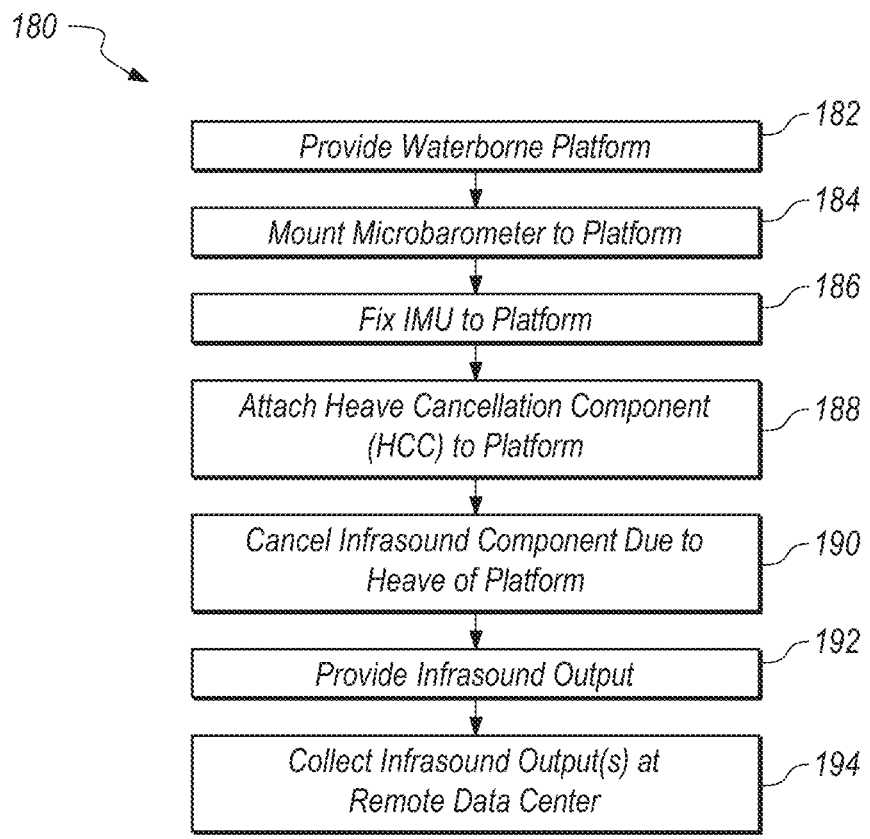

Referring now to FIG. 18, a block diagram 180 is shown, which can be indicative of steps that can be taken to accomplish the methods of the present invention according to several embodiments. As shown, methods 180 can include the initial step 182 of providing at least one waterborne platform. A microbarometer 16 can be mounted to waterborne platform 12, step 184, and an IMU 14 can be fixed to platform 12, as shown by step 186 in block diagram 180. Still further an HCC 18 can also be attached to waterborne platform 12, as shown by step 188 in FIG. 18.

The methods according to several embodiments can further include the step 190 of cancelling a component of said infrasound with said HCC that is due to heave of the platform 12. Step 190 can be accomplished at HCC 18 in the manner described above, using an input from IMU 14 and microbarometer 16. The methods 180 can further include the step 190 of providing an infrasound output from HCC 18 to remote data center 13. HCC output can also be provided as a closed feedback input (step 188) to HCC 18 using an RLS adaptive algorithm, in the manner described above. Finally, step 194 of collecting infrasound output(s) at remote data center 13 can also be accomplished.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of the preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A maritime infrasound system comprising:
   at least one platform;
   a microbarometer mounted on said platform, said microbarometer having sufficient sensitivity to detect a pressure gradient of at least 12.5 Pascals per meter (12.5 Pa/m);
   an inertial measurement unit (IMU) mounted on said platform;
   a heave cancellation component (HCC) located on said platform, said heave cancellation filter receiving a pressure input from said microbarometer and a pressure input from said IMU that is based on heave of said microbarometer to generate an output pressure; and,
   said HCC further comprising a filter and an adaptive algorithm, said filter receiving said IMU pressure, environment noise pressure, and said HCC output being further supplied as an error signal to said filter through a closed feedback loop the includes an adaptive algorithm.

2. The system of claim 1, wherein said adaptive algorithm is selected from the group consisting of Recursive Least Square (RLS) and Least Mean Squares (LMS) algorithms.

3. The system of claim 2, wherein said RLS algorithm includes tapped delay line of 11 taps.

4. The system of claim 1, further comprising a data center for receiving said HCC output from said at least one waterborne platform.

5. The system of claim 1, wherein said waterborne platform is selected from the group consisting of buoys, vessels and unmanned surface vehicles (USV's).

6. A method for detecting infrasound in a maritime environment, comprising the steps of:
   A) providing at least one waterborne platform;
   B) mounting a microbarometer having sufficient sensitivity to detect a pressure gradient of at least 12.5 Pascals per meter (12.5 Pa/m) to said waterborne platform;
   C) fixing an inertial measurement unit (IMU) to said waterborne platform;
   D) attaching a heave cancellation component (HCC) to said waterborne platform; and,
   E) cancelling a component of said infrasound with said HCC, using an input from said IMU and said microbarometer.

7. The method of claim 6, further comprising the step of:
   F) providing an infrasound output from said HCC.

8. The method of claim 7, wherein said step E) is accomplished using a pressure input from said microbarometer and a pressure input from said IMU, and wherein said step F) further comprises the steps of:
   F1) including a filter in said HCC; and,
   F2) establishing a closed feedback from said HCC output as an error signal to said filter using an adaptive algorithm.

9. The method of claim 8, wherein said adaptive algorithm is a Recursive Least Squares (RLS) algorithm.

10. The method of claim 7, further comprising the step of:
    G) collecting said infrasound output from said step F) at a remote data center.

11. The method of claim 6, wherein said step A) is accomplished using a said waterborne platform selected from the group consisting of buoys, vessels and unmanned surface vehicles (USV's).

12. An infrasound sensor comprising:
    an unmanned surface vehicle (USV);
    a microbarometer mounted on said USV, said microbarometer having sufficient sensitivity to detect a pressure gradient of at least 12.5 Pascals per meter (12.5 Pa/m);
    an inertial measurement unit (IMU) mounted on said USV;
    a heave cancellation component (HCC) located on said USV, said heave cancellation filter receiving a pressure input from said microbarometer and a pressure input from said IMU that is based on heave of said microbarometer to generate an output pressure; and,
    said HCC further comprising a filter and an adaptive algorithm, said filter receiving said IMU pressure, environment noise pressure, and said HCC output being further supplied as an error signal to said filter through a closed feedback loop the includes an adaptive algorithm.

13. The sensor of claim 12, wherein said adaptive algorithm is selected from the group consisting of Recursive Least Square (RLS) and Least Mean Squares (LMS) algorithms.

14. The sensor of claim 13, wherein said RLS algorithm includes tapped delay line of 11 taps.

* * * * *